Patented Mar. 19, 1935

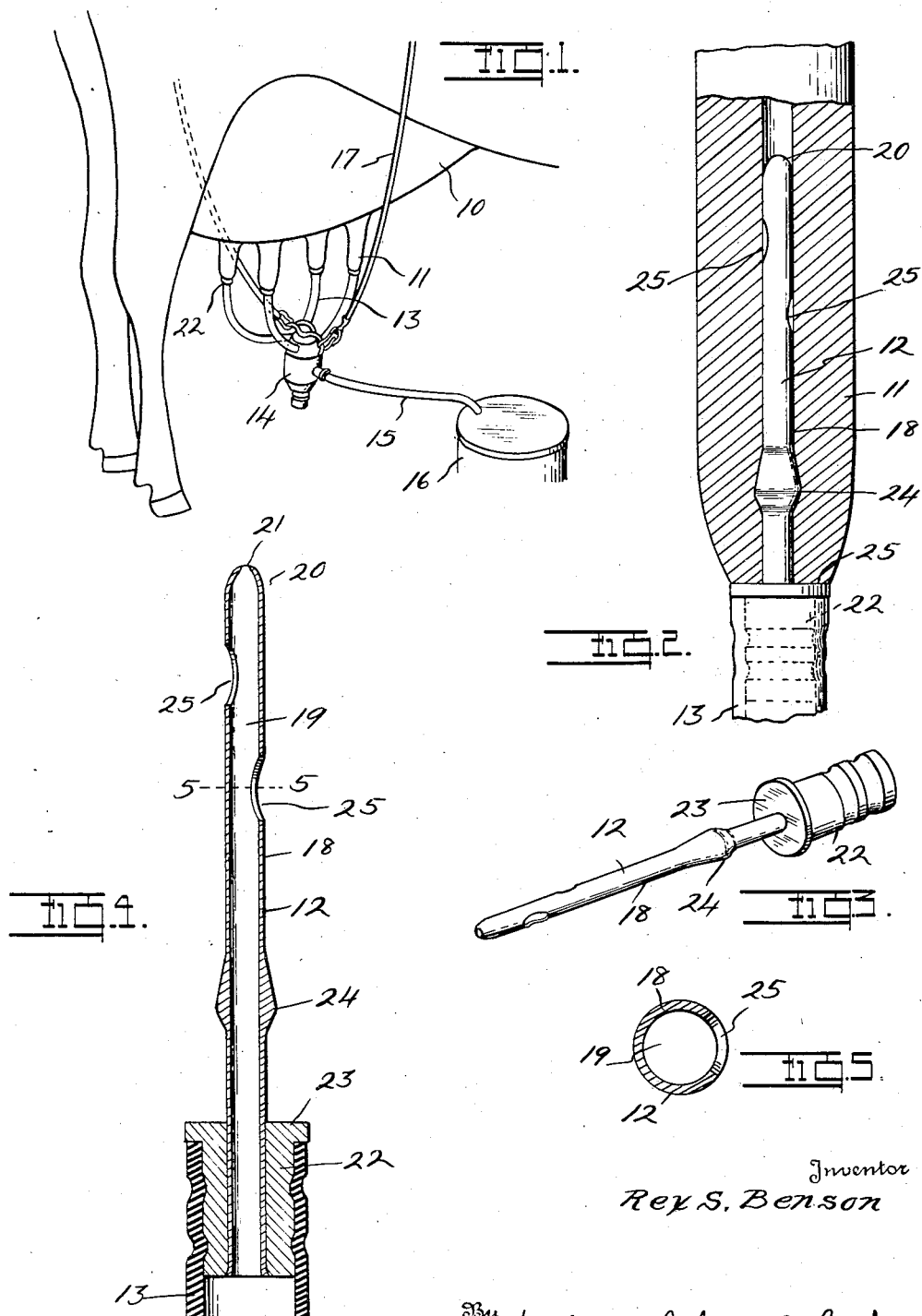

1,995,051

UNITED STATES PATENT OFFICE 1,995,051

TEAT TUBE

Rex S. Benson, Detroit, Mich.

Application March 8, 1933, Serial No. 660,049

1 Claim. (Cl. 31—59)

This invention relates to a milking device for cows, and more especially to an improved construction of milk draining teat tube.

One of the primary objects of my invention is to provide an improved construction of teat tube having an integral annular enlargement formed therein, adjacent but spaced from the discharge end of the tube, adapted for engagement in the teat channel beyond the muscles of the teat which surround the lower end thereof. In accordance with this invention, this enlargement is preferably formed by flowing or otherwise outwardly displacing the outer surface of the wall of the tube so as to produce an annular protruding portion which, however, presents a smooth, unbroken surface throughout and at the points where it merges with the tube so as to eliminate all possibility of injury of the tender tissues of the teat when the tube is inserted and withdrawn.

Another object of the invention is to provide a teat tube having a substantially semi-spherical shaped end designed to facilitate the insertion of the tube into the teat.

Another object of the invention is to provide a teat tube open at both ends so that the milk will flow therethrough by gravity, and whereby the udder can be completely drained.

Another advantage of this construction is that the teat tube may be readily cleaned by passing a brush or the like longitudinally therethrough.

The several objects, advantages and novel details of construction of the invention will be made more apparent as this description proceeds, especially when considered in connection with the accompanying drawing, wherein Figure 1 is a perspective view of a complete milking device employing as a part thereof my improved teat tube;

Figure 2 is an enlarged view showing the tube inserted in the teat;

Figure 3 is a perspective view of the teat tube;

Figure 4 is a longitudinal sectional view through the teat tube, and

Figure 5 is a transverse sectional view taken substantially on the plane indicated by line 5—5 of Figure 4.

In practice, my improved teat tube may be employed to advantage with a milking device of the type illustrated in my co-pending application, Serial No. 610,274, filed May 9, 1932, although however it may be employed with equal facility in connection with other gravity type milking devices.

By reference to Figure 1, it will be noted that there is illustrated the udder 10 of a cow into the teats 11 of which my improved teat tubes 12 are inserted. Each teat tube is connected by means of a rubber tube 13 with a junction or union member 14 from which the milk is conducted through a tube 15 to a receptacle 16. The reference character 17 indicates a supporting strap which is adapted to encircle the cow's body to sustain the weight of the milking device and prevent a withdrawal force being exerted on the teat tubes.

Each teat tube 12 comprises a tubular body 18 formed of nickel silver, or any other preferred or desired material, the tubular body having a longitudinally extending passage 19 therethrough and being open at both ends.

One end of the tube, that is the end inserted in the teat, is shaped to provide a substantially spherical nose 20 in the axial center of which an opening 21 is provided. The shape of this end of the tube facilitates the insertion of the tube into the teat.

The other or opposite end of the tube is formed with an enlarged portion constituting a nipple 22 to which the rubber tube 13 may be connected, this enlarged nipple also forming a shoulder 23 which acts as an abutment to limit the entry or insertion of the tube into the cow's teat.

The reference character 24 indicates an annular enlargement or protrusion formed on the teat tube, this enlargement being located adjacent to but spaced from the shoulder 23. This enlargement or protrusion is preferably formed by flowing the metal of the wall of the tube to produce an annular enlargement integral with the wall of the tube. This enlargement may be formed by means of dies while the tube is interiorly supported by a mandrel or the like. By forming this enlargement in this manner, the wall of the tube is kept smooth and unbroken and sharp shoulders or crevices which might injure the tissues of the cow's teat are eliminated. When the tube is inserted in the teat, this enlargement engages the teat channel beyond the muscles of the teat which surround the lower end thereof and by reasons of the normal contraction of these muscles the teat tube is held in place. The inner surface of the tube is not deflected in producing the enlargement so that no recesses or pockets are formed which might make it different to readily clean the tube.

Intermediate the ends of the tube, I provide one or more apertures 25 which provide communication between the exterior of the tube and the longitudinal channel 19. Thus at the beginning of the milk draining operation some of the milk from the udder may also flow through these apertures as well as through the opening 21 at the inner end of the tube.

It will be noted that the opening 26 at the discharge end of the teat tube, which is in alignment with the opening 21, will permit the tube to be readily cleansed by passing a brush or the like through these aligned openings and the longitudinal passage 19.

The operation of the invention will, of course, be readily understood. When the tubes have been inserted in the teats, the milk from the udder will flow or drain through the tubes by gravity and thence through the branch tubes 13, union 14, and tube 15 to the container 16. The provision of the opening 21 in the end of the teat tube assures a complete drainage of the milk and when the milk has ceased to flow, the udder is completely dry.

A teat tube constructed in accordance with this invention may be quickly and economically manufactured; may be easily inserted and withdrawn from the teat without danger of injury thereto; and may be readily cleaned.

Having thus described my invention, what I claim is:

In a milking device, a teat tube comprising a tubular body having a passage of substantially uniform diameter throughout its length extending longitudinally therethrough and open at both ends, the portion of the tubular body surrounding the opening at one end being shaped to provide a substantially semi-spherical rounded nose to facilitate the insertion of the tube into the cow's teat, a separate enlarged nipple portion rigidly secured on the opposite end of the tube providing a hose connection and forming a shoulder to limit the entry of the tube into the cow's teat, and a radially outwardly extending integral enlargement on said tubular body formed from the material of the outer surface of the wall thereof thereby leaving the inner surface of the tube which constitutes the wall of the passage smooth and of uniform diameter, said enlargement being spaced from said shoulder for engagement in the teat channel beyond the muscles of the teat which surround the lower end thereof.

REX S. BENSON.